United States Patent
Katagiyama et al.

(10) Patent No.: US 8,915,652 B2
(45) Date of Patent: Dec. 23, 2014

(54) OPTICAL CONNECTOR DEVICE AND MATING OPTICAL CONNECTOR DEVICE

(75) Inventors: Naoki Katagiyama, Tokyo (JP); Yuichi Koreeda, Tokyo (JP); Hisaya Takahashi, Tokyo (JP); Mikio Oda, Tokyo (JP); Hideyuki Ono, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 133 days.

(21) Appl. No.: 13/321,893

(22) PCT Filed: Apr. 20, 2010

(86) PCT No.: PCT/JP2010/056974
§ 371 (c)(1),
(2), (4) Date: Jan. 31, 2012

(87) PCT Pub. No.: WO2010/137426
PCT Pub. Date: Dec. 2, 2010

(65) Prior Publication Data
US 2012/0128302 A1    May 24, 2012

(30) Foreign Application Priority Data
May 26, 2009   (JP) .................. 2009-126209

(51) Int. Cl.
G02B 6/36   (2006.01)
G02B 6/38   (2006.01)

(52) U.S. Cl.
CPC ............ *G02B 6/3825* (2013.01); *G02B 6/3879* (2013.01); *G02B 6/3885* (2013.01); *G02B 6/3893* (2013.01); *G02B 6/3897* (2013.01)
USPC .............................................. 385/53; 385/56

(58) Field of Classification Search
None
See application file for complete search history.

(56) References Cited

U.S. PATENT DOCUMENTS 5,121,454 A * 6/1992 Iwano et al. .................... 385/60
5,134,679 A * 7/1992 Robin et al. .................... 385/90
(Continued)

FOREIGN PATENT DOCUMENTS

CN    1221117 A    6/1999
CN    1833188 A    9/2006
(Continued)

OTHER PUBLICATIONS

International Search Report of PCT/JP2010/056974, date of mailing Jun. 8, 2010.
(Continued)

*Primary Examiner* — Mike Stahl
(74) *Attorney, Agent, or Firm* — Collard & Roe, P.C.

(57) ABSTRACT

Optical connectors can be easily attached to and detached from a housing.

An optical connector device 11 adapted to be connected to a mating optical connector device 81 includes a first housing 31 for receiving and holding optical connectors 61, a second housing 41 for holding the first housing 31 in a floating manner, and a fixing member 51 for fixedly attaching the second housing 41 to an attachment object 201. To-be-locked portions 35, 37 of the first housing 31 and locking portions 43, 44 of the second housing 41 detachably engage with each other and cause the first housing 31 to engage with the second housing 41 in a floating manner. The to-be-locked portions 35, 37 and the locking portions 43, 44 engage with each other in a direction perpendicular to a direction A1 of connection to the mating optical connector device 81.

4 Claims, 9 Drawing Sheets (56) References Cited

U.S. PATENT DOCUMENTS

| | | | |
|---|---|---|---|
| 5,155,784 A | 10/1992 | Knott | |
| 5,921,796 A * | 7/1999 | Morlion et al. | 439/247 |
| 5,923,805 A | 7/1999 | Anderson et al. | |
| 6,076,975 A | 6/2000 | Roth | |
| 6,819,855 B2 | 11/2004 | Fujiwara et al. | |
| 7,556,436 B2 | 7/2009 | Van Der Steen | |
| 7,706,655 B2 | 4/2010 | Shiratori et al. | |
| 7,991,252 B2 * | 8/2011 | Cheng et al. | 385/25 |
| 2002/0150347 A1 * | 10/2002 | Fujiwara et al. | 385/56 |
| 2004/0017983 A1 | 1/2004 | Chen et al. | |
| 2004/0072454 A1 | 4/2004 | Nakajima et al. | |
| 2007/0286555 A1 * | 12/2007 | Kiani et al. | 385/72 |
| 2008/0205823 A1 * | 8/2008 | Luther et al. | 385/59 |
| 2008/0298751 A1 | 12/2008 | Shiratori et al. | |
| 2012/0141072 A1 * | 6/2012 | Katagiyama et al. | 385/72 |

FOREIGN PATENT DOCUMENTS

| | | |
|---|---|---|
| EP | 1 179 745 | 2/2002 |
| JP | 4-96703 | 8/1992 |
| JP | 5-60939 | 3/1993 |
| JP | 9-311245 | 12/1997 |
| JP | 2000-131562 | 5/2000 |
| JP | 2001-305391 | 10/2001 |
| JP | 2002-122754 | 4/2002 |
| JP | 2002-148479 | 5/2002 |
| JP | 2004-93828 A * | 3/2004 |
| JP | 2007-519966 | 7/2007 |
| JP | 2008-298882 | 12/2008 |
| JP | 2008-299348 A | 12/2008 |

OTHER PUBLICATIONS

Chinese Office Action in Chinese Application No. 201080021043.8, Jun. 28, 2013.

Korean Office Action in 10-2013-7025302, dated Aug. 13, 2014, with English translation of relevant parts.

* cited by examiner

OPTICAL CONNECTOR DEVICE AND MATING OPTICAL CONNECTOR DEVICE

CROSS REFERENCE TO RELATED APPLICATIONS

This application is the National Stage of PCT/JP2010/056974 filed on Apr. 20, 2010, which claims priority under 35 U.S.C. §119 of Japanese Application No. 2009-126209 filed on May 26, 2009. The international application under PCT article 21(2) was not published in English.

TECHNICAL FIELD

This invention relates to an optical connector device and a mating optical connector device that achieve a floatable connection by providing a floating structure in at least one of the optical connector device and the mating optical connector device adapted to be connected to the optical connector device.

BACKGROUND ART

As a related art 1, there is known a backplane connector having a printed board housing adapted to be attached to a printed board (see, e.g. Patent Document 1).

In the printed board housing, a plurality of plug holes for attaching optical connector plugs are aligned in one row. By movement toward a backplane, the printed board housing is fitted to a backplane housing attached to the backplane.

It is configured that the plurality of optical connector plugs inserted into the plug holes of the printed board housing so as to be engaged and held therein are collectively connected to a plurality of optical connector plugs inserted into plug holes of the backplane housing so as to be engaged and held therein.

In the backplane connector, the printed board housing on the printed board side is fixed to the printed board by screws.

PRIOR ART DOCUMENT

Patent Document

Patent Document 1: JP-A-2002-122754 (see FIG. 24 in the publication)

SUMMARY OF THE INVENTION

Problem to be Solved by the Invention

In the backplane connector of Patent Document 1, there is a problem that since the plug holes of the printed board housing are close to the printed board, the insertion and removal operations of the optical connector plugs into and from the plug holes of the printed board housing are difficult and thus it is necessary to carry out the insertion and removal of the optical connectors using a jig.

It is therefore an object of this invention to provide an optical connector device and a mating optical connector device that enable an optical connector, adapted to be received and held in a housing, to be easily attached to and detached from the housing.

It is another object of this invention to provide an optical connector device and a mating optical connector device that can improve the operability when attaching and detaching a housing to and from an attachment object.

Means for Solving the Problem

According to an exemplary aspect of the present invention, there is provided an optical connector device adapted to be connected to a mating optical connector device, the optical connector device comprising a first housing for receiving and holding an optical connector, a second housing for holding the first housing in a floating manner, and a fixing member for fixedly attaching the second housing to an attachment object, wherein, the first housing comprises a to-be-locked portion, and the second housing comprises a locking portion, and wherein, the to-be-locked portion and the locking portion detachably engage with each other and cause the first housing to engage with the second housing in a floating manner, and the to-be-locked portion and the locking portion engage with each other in a direction perpendicular to a direction of connection to the mating optical connector device.

According to an exemplary aspect of the present invention, the to-be-locked portion may comprise a projection receiving portion and a lock receiving portion, the locking portion comprises a projection and a projecting locking portion, the projection receiving portion engages with the projection, and the lock receiving portion engages with the projecting locking portion.

According to an exemplary aspect of the present invention, the mating optical connector device may comprise a mating second housing for receiving and holding a mating optical connector and a mating first housing for detachably holding the mating second housing, and the mating first housing is adapted to be attached to a mating attachment object.

According to an exemplary aspect of the present invention, the mating second housing may be engaged with and held by the mating first housing in a floating manner.

Effect of the Invention

According to an optical connector device and a mating optical connector device based on an embodiment mode of this invention, at least the optical connector device on the attachment object side can be provided with a floating structure and further is configured such that a housing of the optical connector device can be attached to and detached from the attachment object. As a consequence, there is an advantage in that optical connector attaching and detaching operations can be easily carried out without requiring a jig.

MODE FOR CARRYING OUT THE INVENTION

Figure 1:
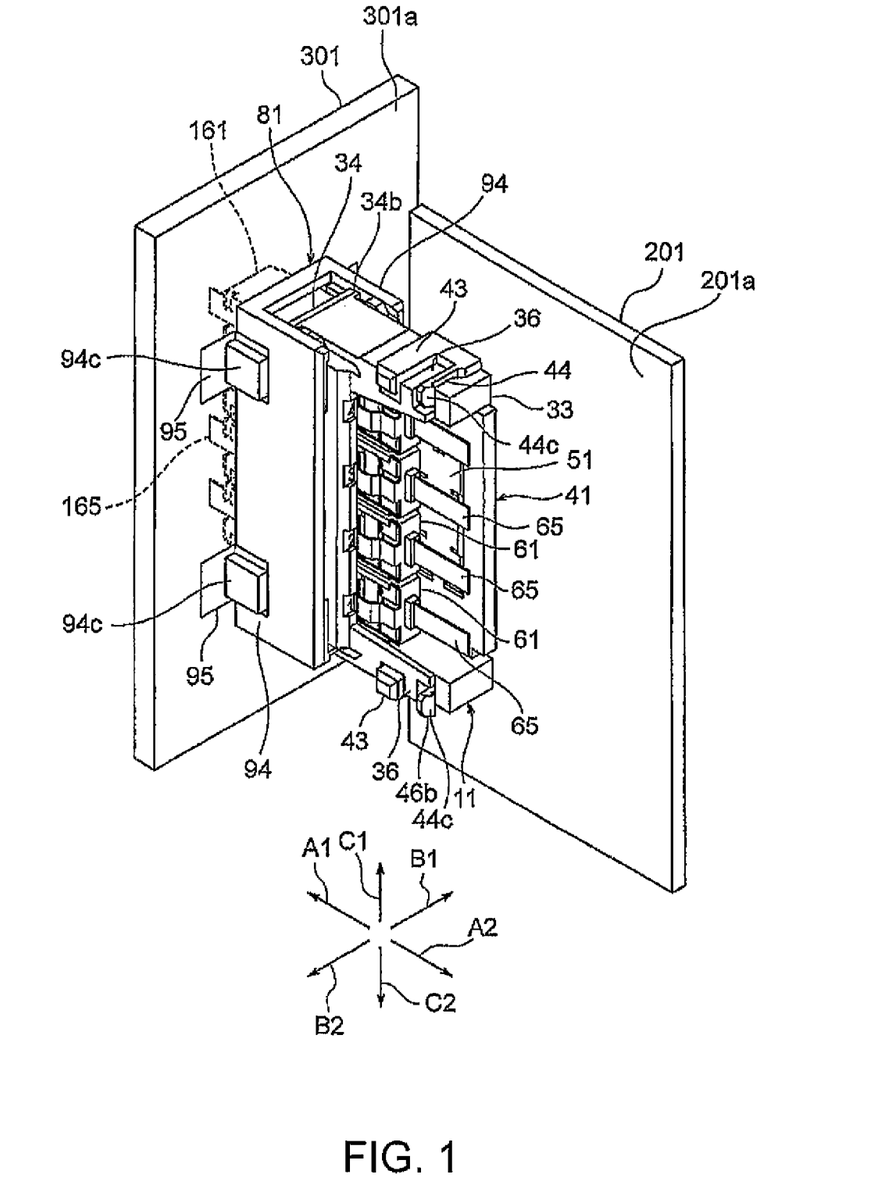
FIG. 1 is a perspective view showing a state where an optical connector device and a mating optical connector device according to an embodiment of this invention are connected together, wherein the optical connector device is attached to a connection object and the mating optical connector device is attached to a mating connection object.
Figure 2:
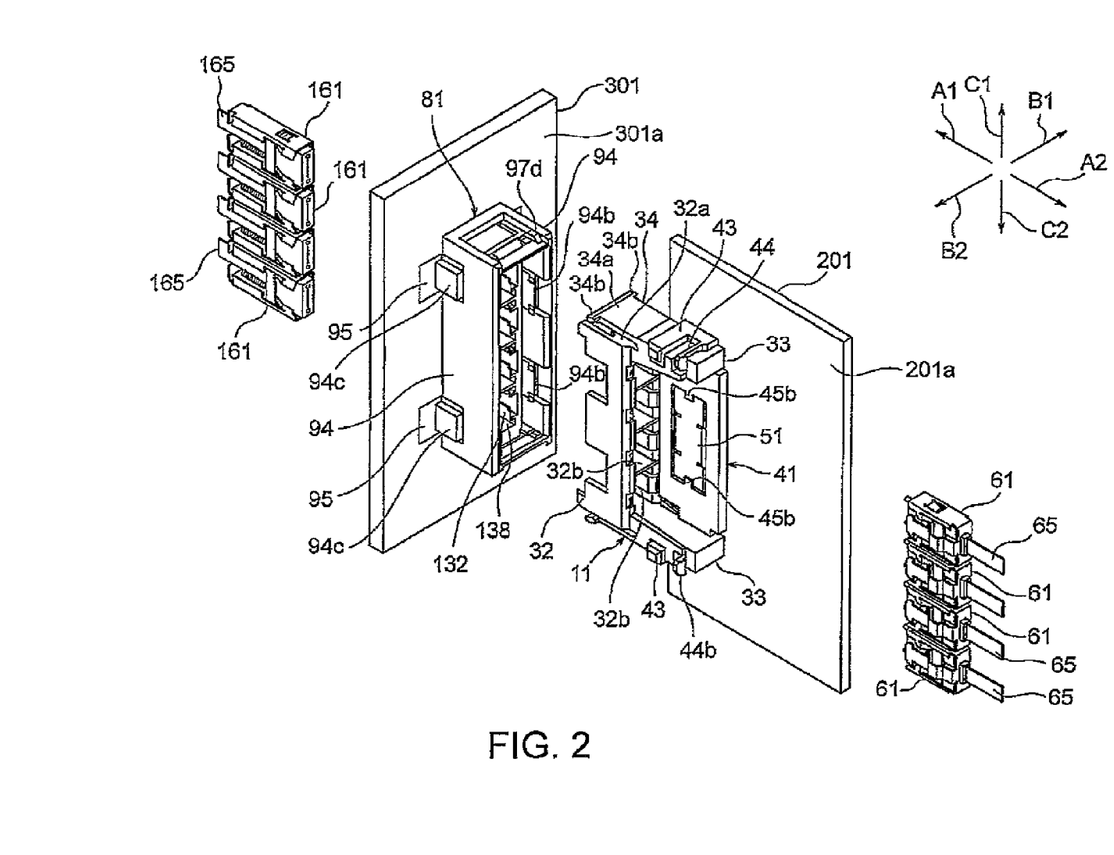
FIG. 2 is a perspective view showing a state where the optical connector device is detached from the mating optical connector device, which are shown in FIG. 1.

FIG. 1 shows a state where an optical connector device and a mating optical connector device according to an embodiment of this invention are connected together. FIG. 2 shows a state where the optical connector device is detached from the mating optical connector device, which are shown in FIG. 1.

Referring to FIGS. 1 and 2, an optical connector device 11 is attached to a surface 201a of an attachment object 201. A mating optical connector device 81 is attached to a surface 301a of a mating attachment object 301.

The attachment object 201 and the mating attachment object 301 as preferred examples are each a printed wiring board. In the following description, the attachment object 201 will be called a package board, while the mating attachment object 301 will be called a backboard.

The package board 201 and the backboard 301 are disposed in directions in which their board surfaces are perpendicular to each other. The optical connector device 11 attached to the package board 201 is fitted to the mating optical connector device 81 attached to the backboard 301 so as to be connected thereto.

The backboard 301 is fixed to a non-illustrated housing. That is, the mating optical connector device 81 attached to the backboard 301 is a receptacle-side optical connector device. The optical connector device 11 attached to the package board 201 is a plug-side optical connector device.

Figure 3:
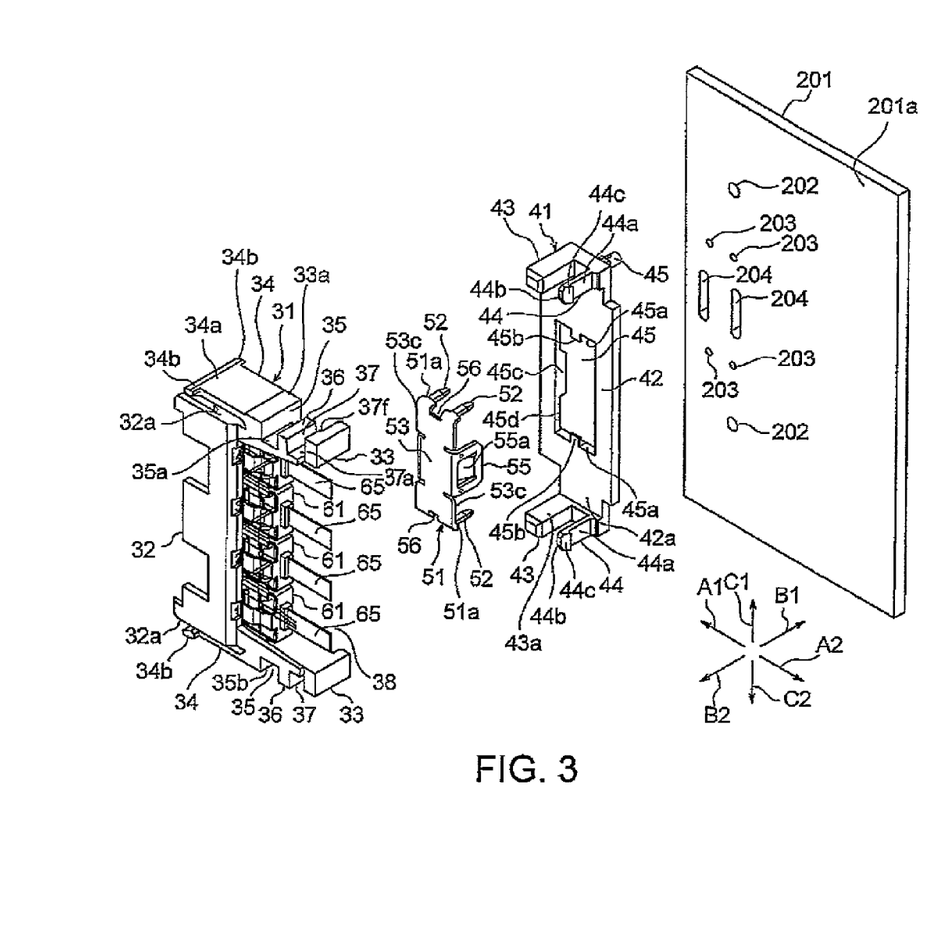
FIG. 3 is a perspective view showing a state where the optical connector device shown in FIG. 1 is disassembled in a state where the optical connector device is detached from the connection object.

FIG. 3 shows a state where the optical connector device 11 is detached from the package board 201 and further is disassembled into its components.

As is also shown in FIG. 3, the optical connector device 11 comprises a plurality of optical connectors 61, a first housing 31 adapted to receive and hold the optical connectors 61, a second housing 41 adapted to hold the first housing 31 in a floating manner, and a fixing member 51 for fixedly attaching the second housing 41 to the package board 201.

The optical connector device 11 attached to the package board 201 is fitted to the mating optical connector device 81 by moving the optical connector device 11 in a first direction (connection direction) A1.

Hereinbelow, a direction opposite to the first direction A1 will be called a second direction A2, one of directions perpendicular to the first and second directions A1 and A2 in a common virtual plane including the first and second directions A1 and A2 will be called a third direction B1, a direction opposite to the third direction B1 will be called a fourth direction B2, and a description will be given by identifying the directions by arrows in the respective figures.

Further, in the following description, one of directions perpendicular to the first to fourth directions A1, A2, B1, and B2 will be called a fifth direction C1, a direction opposite to the fifth direction C1 will be called a sixth direction C2, and a description will be given by identifying the directions by arrows in the respective figures.

The first housing 31 is made of a resin material. The first housing 31 has a fitting portion 32 adapted to be fitted to the mating optical connector device 81, a pair of block portions 33 extending in the second direction A2 from both end portions, on the fifth direction C1 side and the sixth direction C2 side, of the fitting portion 32, respectively, and facing each other, and a pair of fitting locking spring portions 34 of a thin plate shape extending to the first direction A1 side from both end portions, on the fifth direction C1 side and the sixth direction C2 side, of the fitting portion 32, respectively.

The pair of block portions 33 each have a groove-like projection receiving portion 35 formed on an outer surface 33a for locking to the second housing 41, and a groove-like lock receiving portion 37 formed on the outer surface 33a in the second direction A2 from the projection receiving portion 35 through a partition wall portion 36 of the block portion 33. The projection receiving portion 35 and the lock receiving portion 37 jointly form a to-be-locked portion.

The pair of fitting locking spring portions 34 face end faces 32a, on both end sides on the fifth direction C1 side and the sixth direction C2 side, of the fitting portion 32, respectively, and are adapted to bend toward the end face 32a sides of the fitting portion 32, respectively.

End portions, on the second direction A2 side, of the pair of fitting locking spring portions 34 are connected to the block portions 33, respectively. Further, end portions, extending to the first direction A1 side, of the fitting locking spring portions 34 are formed as free end portions 34a. Each end portion 34a is formed with a pair of fitting locking portions 34b protruding slightly to the third direction B1 side and the fourth direction B2 side, respectively.

Further, the first housing 31 has a portion surrounded by a rear portion, on the second direction A2 side, of the fitting portion 32 and the pair of block portions 33, which serves as an optical connector receiving portion 38 for receiving the plurality of optical connectors 61. In the optical connector receiving portion 38, the plurality of optical connectors 61 are received so as to be disposed parallel to the surface 201a of the package board 201.

In a front portion, on the second direction A2 side, of the fitting portion 32, there are formed a plurality of fitting locking portions 32b which are defined so as to receive front portions, on the first direction A1 side, of the optical connectors 61, respectively (see FIG. 2).

The second housing 41 is formed by molding a resin material. The second housing 41 has a plate-like base portion 42, a pair of columnar projections 43 formed so as to extend in the fourth direction B2 from a surface 42a of the base portion 42, a pair of cantilever projecting locking portions 44 formed so as to extend in the fourth direction B2 from the surface 42a of the base portion 42, and a pair of boss portions 45 extending in the third direction B1 from the other surface of the base portion 42.

The pair of projections 43 face each other in the fifth and sixth directions C1 and C2. The pair of projecting locking portions 44 face each other in the fifth and sixth directions C1 and C2. Further, the projection 43 and the projecting locking portion 44 face each other in the first and second directions A1 and A2. The projection 43 and the projecting locking portion 44 jointly form a locking portion.

Each projection 43 has a columnar shape and is a portion adapted to engage with the projection receiving portion 35 of the first housing 31. When the projection 43 and the projection receiving portion 35 are in engagement with each other, the dimension between the projection 43 and the projection receiving portion 35 is set so that a gap S1 (see FIGS. 3 and 5) is provided between a bottom surface 35a of the projection receiving portion 35 and a side surface 43a, facing the projection receiving portion 35 in the fifth and sixth directions C1 and C2, of the projection 43.

Figure 5:
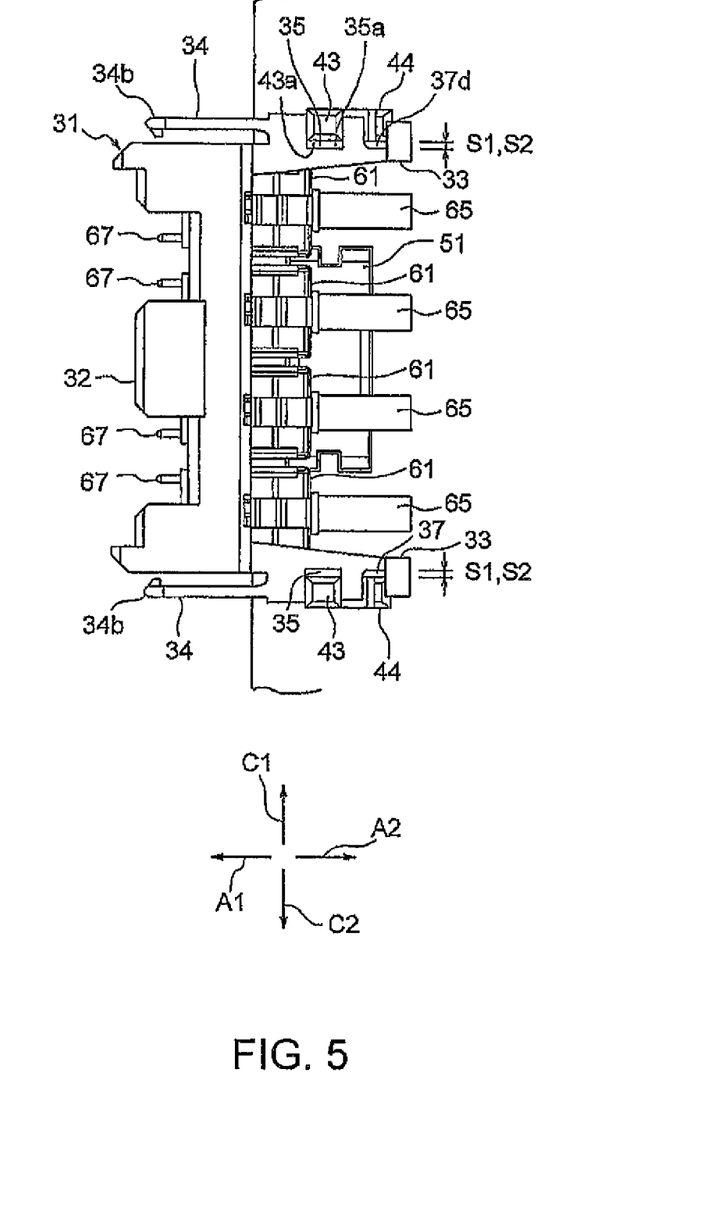
FIG. 5 is a front view of the state, shown in FIG. 1, where the optical connector device is attached to the package board.

Specifically, in this embodiment, with respect to the fifth and sixth directions C1 and C2, the distance between the bottom surfaces 35a of the pair of projection receiving portions is set to 35.8 mm, while the distance between the side surfaces 43a of the pair of projections 43 is set to 37.7 mm.

Therefore, the gap S1 is set to a maximum of 1.9 mm. Specifically, the gap S1 is set so as to be 1.9 mm in the state where the first housing 31 is offset in the fifth direction C1 or the sixth direction C2 with respect to the second housing 41.

Although the gap S1 is set to the maximum of 1.9 mm in this embodiment as described above, its specific dimension may be suitably set according to an embodiment mode.

Each projecting locking portion 44 has a thin plate-like locking spring portion 44a extending from the surface 42a of the base portion 42 and a projecting portion 44b formed at a distal end portion of the locking spring portion 44a.

The projecting portion 44b has an inclined surface 44c which is inclined from its end on the fourth direction B2 side toward the third direction B1 in a direction away from the locking spring portion 44a.

Each projecting locking portion 44 is a portion adapted to engage with the lock receiving portion 37 of the first housing 31. When the projecting locking portion 44 and the lock receiving portion 37 are in engagement with each other, the dimension between the projecting locking portion 44 and the lock receiving portion 37 is set so that a gap S2 (see FIGS. 3 and 5) is provided between the locking spring portion 44a of the projecting locking portion 44 and a bottom surface 37d, facing the locking spring portion 44a in the fifth and sixth directions C1 and C2, of the lock receiving portion 37.

Specifically, in this embodiment, with respect to the fifth and sixth directions C1 and C2, the distance between bottom surfaces 37d of the pair of lock receiving portions 37 is set to 35.8 mm, while the distance between the pair of locking spring portions 44a is set to 37.7 mm.

Therefore, the gap S2 is set to a maximum of 1.9 mm. Specifically, the gap S2 is set so as to be 1.9 mm in the state where the first housing 31 is offset in the fifth direction C1 or the sixth direction C2 with respect to the second housing 41.

Although the gap S2 is set to the maximum of 1.9 mm in this embodiment as described above, its specific dimension may be suitably set according to an embodiment mode.

Further, the dimensions of the projecting locking portion 44 and the lock receiving portion 37 are set so that when the projecting locking portion 44 and the lock receiving portion 37 are in engagement with each other, a gap S3 (see FIG. 6) is provided between a locking surface 44d of the projecting portion 44b of the projecting locking portion 44 and an abutting surface 33d of the block portion 33 in the third and fourth directions B1 and B2.

Figure 6:
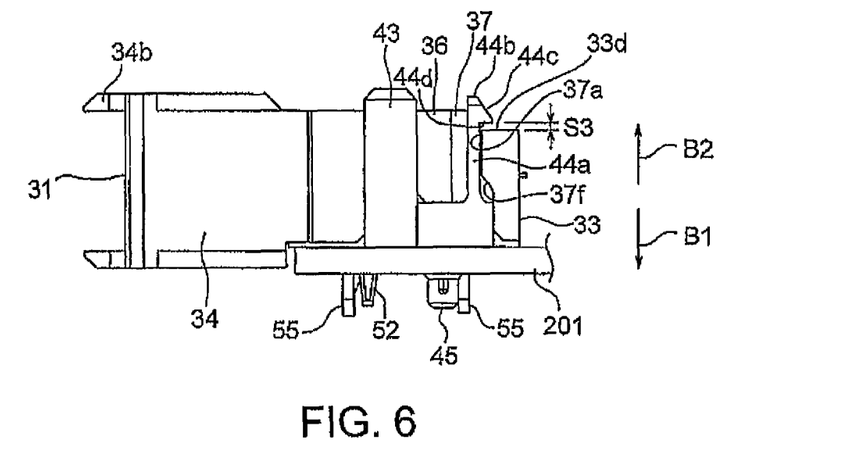
FIG. 6 is a side view showing a part of the optical connector device in the state, shown in FIG. 1, where the optical connector device is attached to the connection object.

Specifically, in this embodiment, with respect to the third and fourth directions B1 and B2, the dimension from the surface 42a of the base portion 42 to the locking surface 44d of the projecting locking portion 44 of the second housing is set to 5.6 mm, while the dimension from the surface 42a of the base portion 42 to the abutting surface 33d of the block portion 33 is set to 5.0 mm (in a state where the first housing 31 does not float with respect to the second housing 41).

Therefore, the gap S3 is set to a maximum of 0.6 mm. Specifically, the gap S3 is set so as to be 0.6 mm in the state where the first housing 31 does not float with respect to the second housing 41.

Although the gap S3 is set to the maximum of 0.6 mm in this embodiment as described above, its specific dimension may be suitably set according to an embodiment mode.

In a central portion of the base portion 42, an opening 45 is formed by removing a part of the plate surface of the base portion 42 for receiving the fixing member 51 therein. The opening 45 has a pair of locking pieces 45b facing each other at a pair of edges 45a which are opposed to each other in the fifth and sixth directions C1 and C2.

The pair of locking pieces 45b slightly protrude in the fifth and sixth directions C1 and C2. The locking piece 45b is located at a central portion, in the first and second directions A1 and A2, of each edge 45a.

Further, the opening 45 is formed with a pair of abutting pieces 45c facing each other in the first and second directions A1 and A2. The pair of abutting pieces 45c extend in the third direction B1 from a pair of edges 45d which are parallel to the fifth and sixth directions C1 and C2.

As one example, the fixing member 51 can be formed by punching out a thin metal member and then bending it. The fixing member 51 has a flat plate-like fixing portion 53, a plurality of terminal portions 52 connected to the fixing portion 53, a pair of spring plate portions 55 connected to the fixing portion 53, and a pair of cutout portions 56 formed in the fixing portion 53.

The terminal portions 52 extend in the third direction B1 from both edges 51a, in the fifth and sixth directions C1 and C2, of the fixing portion 53, respectively. The spring plate portions 55 extend in the third direction B1 from a pair of edges 53c which are parallel to the fifth and sixth directions C1 and C2. The cutout portions 56 are portions formed by cutting out the pair of edges 51a in the fifth and sixth directions C1 and C2, respectively, between the terminal portions 52 in the first and second directions A1 and A2.

The spring plate portions 55 each have a cantilever spring portion 55a formed by cutting and raising a part of the spring plate portion 55. An end portion, in the third direction B1, of the spring portion 55a is connected to the spring plate portion 55.

Figure 4A:
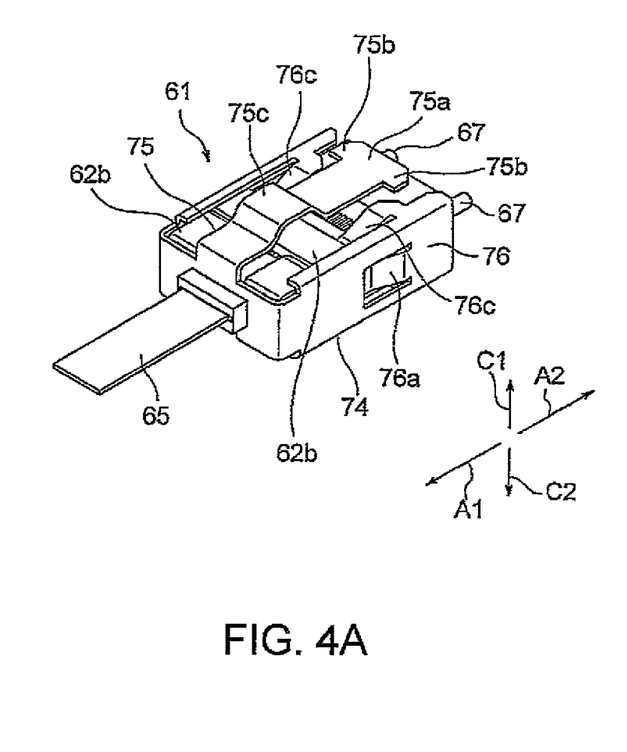
FIG. 4A is a perspective view showing in an enlarged manner an optical connector shown in FIG. 2.
Figure 4B:
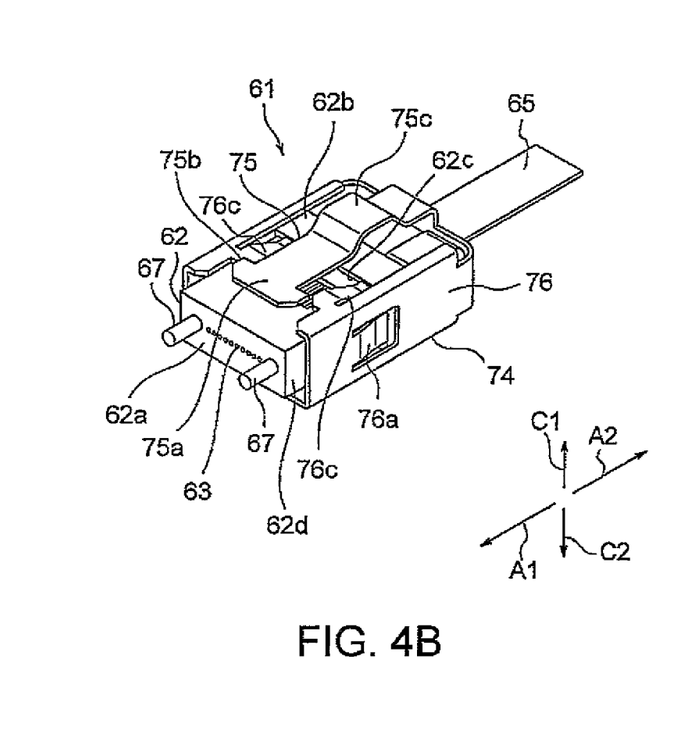
FIG. 4B is a perspective view in which the optical connector shown in FIG. 4A is seen from the opposite side.

As is also shown in FIGS. 4(A) and 4(B), each optical connector 61 has a rectangular ferrule 62, a plurality of optical fibers 63 held by the ferrule 62, and a metal shell 74 covering peripheral surfaces of the ferrule 62 except its ferrule fitting surface 62a and holding the ferrule 62.

In this embodiment, the thickness dimension (the dimension in the third and fourth directions B1 and B2) of the optical connector 61 is set to 4.1 mm.

Although the thickness dimension of the optical connector 61 is set to 4.1 mm in this embodiment as described above, its specific dimension may be suitably set according to an embodiment mode.

A tape fiber 65 is manufactured such that the plurality of optical fibers 63 are held in parallel to each other at intervals using a tape-like resin material. Front end faces of the optical fibers 63 are substantially flush with the ferrule fitting surface 62a. On both sides of the plurality of optical fibers 63, the ferrule fitting surface 62a is formed with a pair of guide pins 67 protruding in the first direction A1.

As one example, the shell 74 can be formed by punching out a thin metal plate and then bending it. The shell 74 is formed with a cantilever optical connector locking portion 75 facing a first surface 62b of the ferrule 62. An end portion, in the second direction A2, of the optical connector locking portion 75 is connected to a rear end portion of the shell 74. The optical connector locking portion 75 has a free end portion 75a on the first direction A1 side. The free end portion 75a is formed with a pair of locking portions 75b protruding in the third and fourth directions B3 and B4, respectively.

Further, the optical connector locking portion 75 has a pressing portion 75c formed by bending its intermediate portion, in the first and second directions A1 and A2, in a direction slightly away from the ferrule 62. When the pressing portion 75c is pressed, the free end portion 75a is displaced toward the first surface 62b.

Further, the shell 74 has first pressing spring portions 76a respectively formed by partially cutting out plate portions of a pair of shell side plates 76 which are parallel to the first and second directions A1 and A2. These first pressing spring portions 76a abut and press second surfaces 62d of the ferrule 62.

Further, the shell 74 is formed with a pair of second pressing spring portions 76c facing the first surface 62b of the ferrule 62. These second pressing spring portions 76c abut a stepped portion 62c formed on the first surface 62b of the ferrule 62, thereby pressing and holding the ferrule 62.

As shown in FIG. 3, the package board 201 is formed with a pair of boss insertion holes 202 for inserting the boss portions 45 of the second housing 41, four terminal press-fitting holes 203 for press-fitting the four terminal portions 52 of the fixing member 51, respectively, and a pair of spring insertion holes 204 for inserting the spring plate portions 55 of the fixing member 51. Each spring insertion hole 204 is a hole which is elongated in the fifth and sixth directions C1 and C2.

Hereinbelow, a description will be given of fixation of the optical connector device 11 to the package board 201 and of assembly of the optical connector device 11.

First, the second housing 41 is attached to the package board 201. In this event, the pair of boss portions 45 of the second housing 41 are press-fitted into the boss insertion holes 202 of the package board 201, respectively. Then, when the fixing member 51 is inserted into the opening 45 of the second housing 41 so that the pair of spring plate portions 55 of the fixing member 51 are inserted into the spring insertion holes 204 of the package board 201, respectively, the spring portions 55a of the spring plate portions 55 are inserted in an elastically deformed state and then are restored so as to be locked to the other surface (not illustrated) of the package board 201. As a consequence, the second housing 41 and the fixing member 51 are fixed to the package board 201. The locking pieces 45b and the cutout portions 56 may be configured to lock the fixing member 51 to the second housing 41.

Therefore, most of the spring plate portions 55 and the terminal portions 52 of the fixing member 51 on the third direction B1 side are in a state of protruding from the other surface of the base portion 42 of the second housing 41.

The terminal portions 52 of the fixing member 51 are press-fitted into the terminal press-fitting holes 203 of the package board 201. The terminal portions 52 are soldered to a circuit provided on the other surface of the package board 201 and are connected to the shells 74 of the optical connectors 61 through the fixing member 51 so as to be grounded.

The second housing 41 and the fixing member 51 are attached to the package board 201 and thus are prevented from moving in the first and second directions A1 and A2 and the third and fourth directions B1 and B2 with respect to the package board 201.

After attaching the second housing 41 and the fixing member 51 to the package board 201, the optical connectors 61 are attached to the optical connector receiving portion 38 of the first housing 31. In this event, when the plurality of optical connectors 61 are inserted one by one in the first direction A1 into the fitting locking portions 32b, respectively, formed in the fitting portion 32 of the first housing 31, the locking portions 75b of the optical connector locking portions 75 of the optical connectors 61 are locked inside the fitting locking portions 32b.

Thereafter, the first housing 31 attached with the optical connectors 61 is attached to the second housing 41. The projection receiving portions 35 and the lock receiving portions 37 of the first housing 31 and the projections 43 and the projecting locking portions 44 of the second housing 41 detachably engage with each other and cause the first housing 31 to engage with the second housing 41 in a floating manner.

FIG. 5 shows a state where the optical connector device 11 is attached to the package board 201. FIG. 6 shows a state, seen from the side, of a part of FIG. 5 (the state where the optical connector device 11 is attached to the package board 201).

Referring to FIGS. 5 and 6, in the state where the optical connector device 11 is attached to the package board 201, the projections 43 of the second housing 41 and the projection receiving portions 35 of the first housing 31 are in engagement with each other. When the projections 43 and the projection receiving portions 35 are in engagement with each other, the gap S1 is provided between the bottom surface 35a of each projection receiving portion 35 and the side surface 43a, facing the bottom surface 35a of the projection receiving portion 35 in the fifth and sixth directions C1 and C2, of the projection 43.

When the projecting locking portions 44 and the lock receiving portions 37 are in engagement with each other, the gap S2 is provided between each projecting locking portion 44 and the bottom surface 37d of the lock receiving portion 37 in the fifth and sixth directions C1 and C2.

Therefore, the first housing 31 is movable in the fifth and sixth directions C1 and C2 by means of the gaps S1 and S2 between the first housing 31 and the second housing 41.

Further, as shown in FIG. 6, when the projecting locking portions 44 and the lock receiving portions 37 are in engagement with each other, the gap S3 is provided between the projecting portion 44b of each projecting locking portion 44 and the abutting surface 33d of the block portion 33 in the third and fourth directions B1 and B2.

Therefore, the first housing 31 is movable in the third and fourth directions B1 and B2 by means of the gap S3 between the first housing 31 and the second housing 41 so that the first housing 31 has a floating structure which is floatable with respect to the second housing 41 in the movable range of the gap S3.

Figure 7:
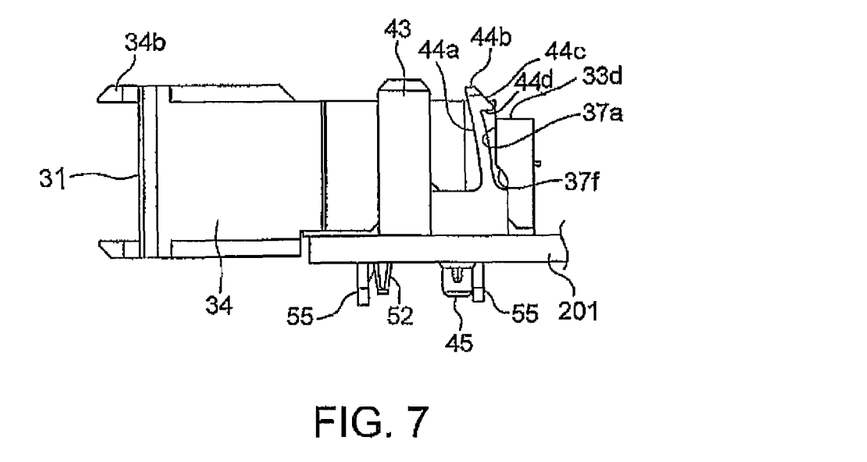
FIG. 7 is a side view showing an initial operation for detaching a first housing from a second housing in the optical connector device shown in FIG. 6.
Figure 8:
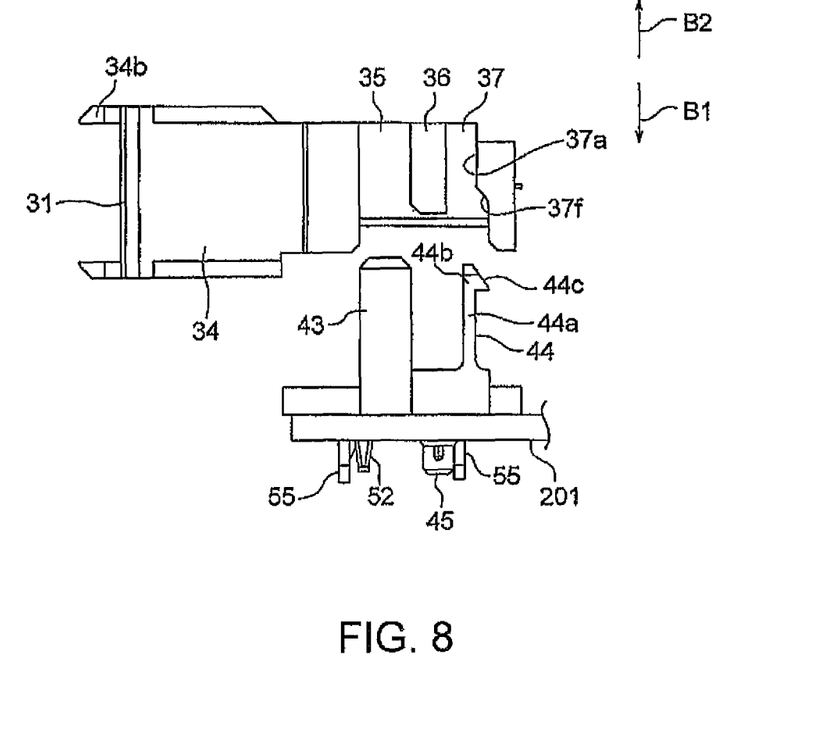
FIG. 8 is a side view showing a state where the first housing is detached from the second housing in the optical connector device shown in FIG. 7.

FIG. 7 shows an initial operation for detaching the first housing 31 from the second housing 41 in the optical connector device 11 shown in FIG. 6. FIG. 8 shows a state where the first housing 31 is detached in the optical connector device 11 shown in FIG. 7.

For detaching the first housing 31 from the second housing 41, as shown in FIG. 7, the locking spring portions 44a of the second housing 41 are bent toward the projection 43 sides, thereby moving the projecting portions 44b.

When the first housing 31 is pulled out in the fourth direction B2 after moving the projecting portions 44b as described above, the first housing 31 can be detached from the second housing 41 as shown in FIG. 8.

Therefore, in the case of the optical connector device 11 on the package board 201 side, since the first housing 31 of the optical connector device 11 can be detached from the package board 201, the optical connectors 61 can be easily attached and detached without requiring a jig. After the first housing 31 is detached, the locking spring portions 44a of the second housing 41 are restored to the natural state shown in FIG. 3.

For attaching the first housing 31 to the second housing 41 in the optical connector device 11, the first housing 31 is moved in the third direction B1 in the detached state shown in FIG. 8, thereby inserting the projections 43 of the second housing 41 into the projection receiving portions 35 of the first housing 31 and, simultaneously, inserting the projecting locking portions 44 of the second housing 41 into the lock receiving portions 37 of the first housing 31.

Each lock receiving portion 37 has a side surface (wall surface) 37a formed with an inclined surface 37f for sliding contact with the inclined surface 44c of the projecting portion 44b of the projecting locking portion 44 in this event.

As a consequence, by pushing the inclined surfaces 44c of the projecting portions 44b with the inclined surfaces 37f of the lock receiving portions 37, the first housing 31 can be attached while bending the locking spring portions 44a.

Figure 9:
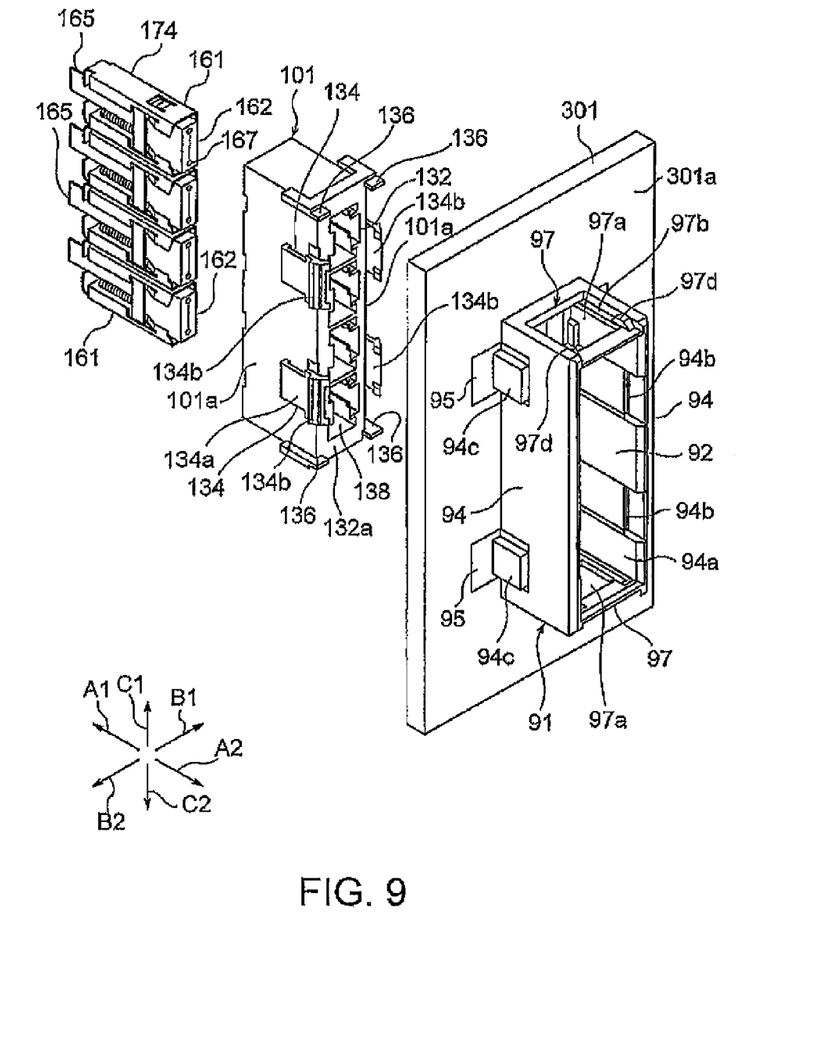
FIG. 9 is a perspective view showing a state where the mating optical connector device shown in FIG. 1 is disassembled.

As shown in FIG. 9, the mating optical connector device 81 comprises a mating second housing (inner housing) 101 adapted to receive and hold mating optical connectors 161, and a mating first housing (outer housing) 91 adapted to detachably hold the mating second housing 101.

The mating first housing 91 is made of a resin material and is formed into a rectangular parallelepiped shape with two open surfaces.

The inside of the mating first housing 91 serves as a mating fitting portion 92 into which the fitting portion 32 of the first housing 31 of the optical connector device 11 is fitted. Each of first inner wall surfaces 94a of a pair of first wall portions 94, facing each other in the third and fourth directions B1 and B2, of the mating fitting portion 92 is formed with a pair of mating first locking portions 94b. Each mating first locking portion 94b is a portion formed into a stepped shape as a stepped portion by recessing the first inner wall surface 94a toward an outer wall surface.

The mating first housing 91 is adapted to be attached to the surface 301a of the backboard 301. A pair of holddowns 94c for soldering to conductive pads 95 of the backboard 301 are attached to or press-fitted into each of the outer wall surfaces of the pair of first wall portions 94, facing each other in the third and fourth directions B1 and B2, of the mating fitting portion 92.

The other ends of the holddowns 94c are adapted to be fixed, by soldering, to the conductive pads 95 formed on the surface 301a of the backboard 301.

Further, in the mating first housing 91, an opening 97a is formed in each of a pair of second wall portions 97 connected to the pair of first wall portions 94 and facing each other in the fifth and sixth directions C1 and C2. A pair of mating projections 97d of a tapered shape inclined in the first and second directions A1 and A2 are formed on edge faces 97b of the opening 97a of each second wall portion 97.

The fitting locking portions 34b formed at the free end portions 34a of the cantilever fitting locking spring portions 34 formed in the first housing 31 of the optical connector device 11 are adapted to be locked to the mating projections 97d of the mating first housing 91.

The mating second housing 101 is formed into a rectangular parallelepiped shape and is adapted to be held by the mating first housing 91 by inserting it into the mating fitting portion 92 of the mating first housing 91 in the second direction A2.

The mating second housing 101 is made of a resin material. The mating second housing 101 has a plurality of mating fitting portions 132 penetrating along the first and second directions A1 and A2 for fitting to the optical connector device 11, a pair of mating fitting locking spring portions 134 of a thin plate shape extending in the second direction A2 in a cantilever manner beyond a mating fitting surface 132a, on the second direction A2 side, of the mating fitting portions 132 from each of a pair of surfaces 101a, facing each other, of the mating second housing 101, and a pair of mating projecting portions 136 of a thin plate shape extending in the first direction A1 from each of both end portions on the fifth direction C1 side and the sixth direction C2 side.

The mating fitting locking spring portions 134 face each other in the third and fourth directions B1 and B2 and are adapted to bend toward the third direction B1 side and the fourth direction B2 side, respectively.

End portions, extending to the second direction A2 side, of the mating fitting locking spring portions 134 are respectively formed as free end portions 134a. Among the respective free end portions 134a, the free end portions 134a on one side are each formed with a mating locking portion 134b slightly protruding in the third direction B1, while the free end portions 134a on the other side are each formed with a mating locking portion 134b slightly protruding in the fourth direction B2.

Further, in the mating second housing 101, the inside of the mating fitting portions 132 serves as mating optical connector receiving portions 138 for receiving the plurality of mating optical connectors 161. In the mating optical connector receiving portions 138, the plurality of mating optical connectors 161 are received so as to be disposed perpendicular to the surface 301a of the backboard 301.

The mating optical connector receiving portions 138 are defined so as to receive the mating optical connectors 161, respectively.

Figure 10A:
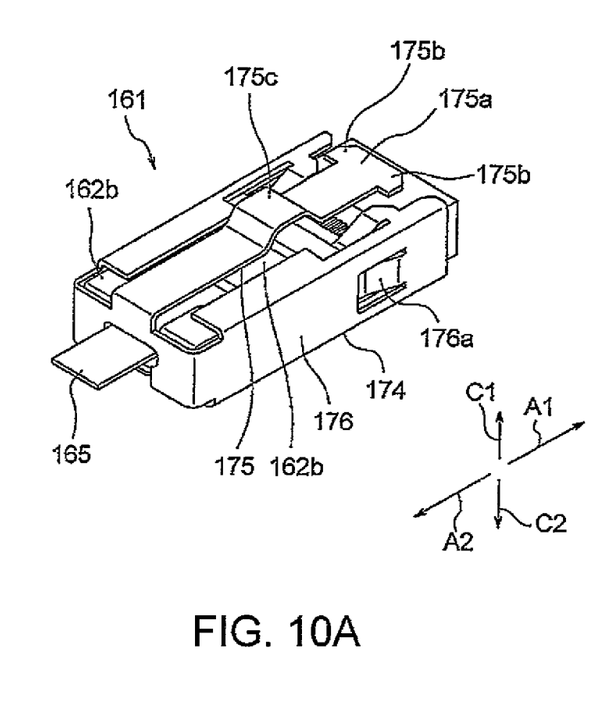
FIG. 10A is a perspective view showing a mating optical connector, shown in FIG. 2, in an enlarged manner by turning it over.
Figure 10B:
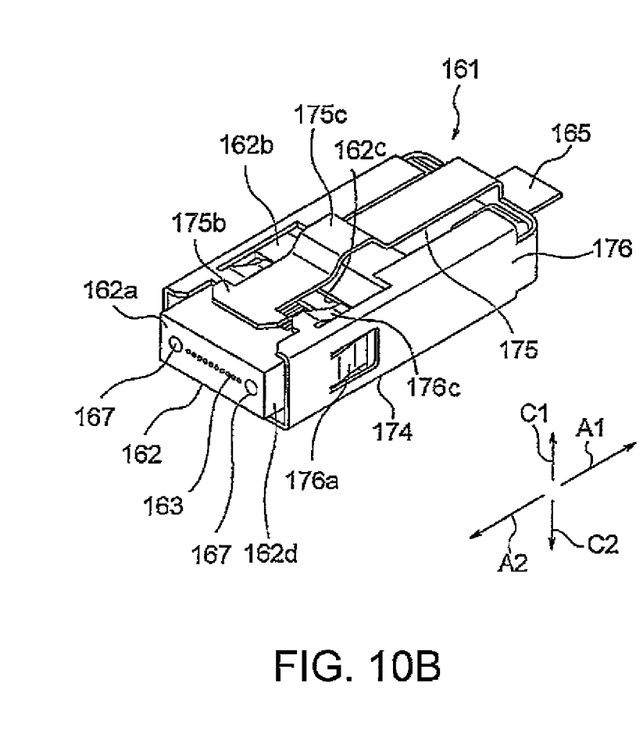
FIG. 10B is a perspective view in which the mating optical connector shown in FIG. 10A is seen from the opposite side.

As is also shown in FIGS. 10(A) and 10(B), each mating optical connector 161 has a plate-like mating ferrule 162, a plurality of mating optical fibers 163 held by the mating ferrule 162, and a metal mating shell 174 covering peripheral surfaces of the mating ferrule 162 except its mating fitting surface 162a and holding the mating ferrule 162.

A mating tape fiber 165 is manufactured such that the plurality of mating optical fibers 163 are held in parallel to each other at intervals using a tape-like resin material.

Front ends of the mating optical fibers 163 are exposed at the ferrule fitting surface 162a of the mating ferrule 162. On both sides of the plurality of mating optical fibers 163, the mating fitting surface 162a of the mating ferrule 162 is formed with a pair of guide holes 167 extending in the first direction A1 from the mating fitting surface 162a to the inside of the mating ferrule 162. The guide holes 167 are portions into which the pair of guide pins 67 of the ferrule 62 are inserted.

The mating shell 174 is formed with a cantilever mating optical connector locking piece 175 facing a surface 162b of the mating ferrule 162. An end portion, in the first direction A1, of the mating optical connector locking piece 175 is connected to a rear end portion of the mating shell 174, while a front end, in the second direction A2, of the mating optical connector locking piece 175 is formed as a free end portion 175a. The free end portion 175a is formed with mating locking pieces 175b protruding in the third and fourth directions B3 and B4, respectively.

Further, the mating optical connector locking piece 175 has a mating pressing portion 175c formed by bending its intermediate portion, in the first and second directions A1 and A2, in a direction slightly away from the mating ferrule 162.

When the mating pressing portion 175c of the mating optical connector locking piece 175 is pressed, its free end portion 175a is displaced toward the surface 162b side of the mating ferrule 162.

Further, the mating shell 174 has mating shell spring pieces 176a respectively formed by partially cutting out a pair of side plates 176 of the mating shell 174 which are parallel to the first and second directions A1 and A2. These mating shell spring pieces 176a abut and press side surfaces 162d of the mating ferrule 162.

Further, the mating shell 174 is formed with a pair of mating pressing spring pieces 176c facing the surface 162b of the mating ferrule 162. These mating pressing spring pieces 176c abut a stepped portion 162c formed on the surface 162b of the mating ferrule 162, thereby pressing and holding the mating ferrule 162.

Hereinbelow, a description will be given of fixation of the mating optical connector device 81 to the backboard 301 and of assembly of the mating optical connector device 81.

First, the mating first housing 91 is attached to the surface 301a of the backboard 301. Although not illustrated, the backboard 301 is formed with a through hole of substantially the same size as an opening of the mating fitting portion 92.

The holddowns 94c are fixed to the fixing portions of the mating first housing 91 by press-fitting one end portions of the holddowns 94c into the fixing portions. The other ends of the holddowns 94c are fixed, by soldering, to the conductive pads 95 formed on the surface 301a of the backboard 301.

Then, the mating optical connectors 161 are inserted in the second direction A2 into the defined mating optical connector receiving portions 138 of the mating second housing 101, respectively, so as to be locked. In this event, when the plurality of mating optical connectors 161 are inserted one by one in the second direction A2 into the defined mating optical connector receiving portions 138 of the mating fitting portions 132 of the mating second housing 101, respectively, the mating optical connectors 161 are locked to mating locking portions (not illustrated) formed in the mating optical connector receiving portions 138.

Thereafter, the mating second housing 101 attached with the mating optical connectors 161 is inserted in the second direction A2 into the mating first housing 91 so as to be attached thereto. In this event, the mating locking portions 134b of the mating fitting locking spring portions 134 of the mating second housing 101 engage with the mating first locking portions 94b of the mating first housing 91.

The mating locking portions 134b of the mating fitting locking spring portions 134 and the mating first locking portions 94b detachably engage with each other and cause the mating second housing 101 to engage with the mating first housing 91 in a floating manner.

That is, the floating structure is enabled by providing gaps between the mating locking portions 134b and the mating first locking portions 94b in the first and second directions A1 and A2 and the fifth and sixth directions C1 and C2.

Further, the mating projecting portions 136 of the mating second housing 101 abut the inner edges of the edge faces 97b formed at the openings 97a of the mating first housing 91.

The optical connector device 11 attached to the package board 201 is fitted in the first direction A1 into the mating optical connector device 81 attached to the backboard 301, thereby achieving connection therebetween. In this event, the fitting locking portions 34b formed at the free end portions 34a of the cantilever fitting locking spring portions 34 formed in the first housing 31 of the optical connector device 11 are locked to the pairs of mating projections 97d formed on the edge faces 97b of the openings 97a of the second wall portions 97 of the mating first housing 91.

The fitting locking portions 34b engage with the mating projections 97d after riding over the mating projections 97d. When the optical connector device 11 is pulled out in the second direction A2 in this engaging state, the fitting locking portions 34b disengage from the mating projections 97d so that the optical connector device 11 can be detached from the mating optical connector device 81.

In the mating optical connector device 81, the mating second housing 101 can be detached from the mating first housing 91 by pushing the mating locking portions 134b of the mating fitting locking spring portions 134 of the mating second housing 101 in the third and fourth directions B1 and B2 to thereby release the engagement with the mating first locking portions 94b. After the mating second housing 101 is detached, the mating fitting locking spring portions 134 of the mating second housing 101 are restored to the natural state.

Therefore, the mating optical connector device 81 on the backboard 301 side can be provided with the floating structure. Further, since the mating second housing 101 of the mating optical connector device 81 can be detached from the backboard 301, the mating optical connectors 161 can be easily attached and detached without requiring a jig.

DESCRIPTION OF SYMBOLS 11 optical connector device
31 first housing
35 projection receiving portion (to-be-locked portion)
37 lock receiving portion (to-be-locked portion)
41 second housing
43 projection (locking portion)
44 projecting locking portion (locking portion)
51 fixing member
61 optical connector
81 mating optical connector device
91 mating first housing
101 mating second housing
161 mating optical connector
201 attachment object (package board)
301 mating attachment object (backboard)

The invention claimed is:

1. An optical connector device which is to be fixed to an attachment object and adapted to be connected to a mating optical connector device, the attachment object and the mating optical connector device being located in directions which are perpendicular to one another,
the optical connector device comprising:
a first housing for receiving and holding an optical connector,
a second housing for holding the first housing in a floating manner such that the first housing is movable relative to the second housing, and
a fixing member for fixedly attaching the second housing to the attachment object,
wherein the first housing comprises a to-be-locked portion, and the second housing comprises a locking portion,
wherein the to-be-locked portion and the locking portion detachably engage with each other and cause the first housing to engage with the second housing in a floating manner such that the first housing is movable relative to the second housing, and the to-be-locked portion and the locking portion detachably engage with each other in the direction perpendicular to the direction of connection to the mating optical connector device, wherein the second housing is fixed to the attachment object in the state wherein the second housing is engaged with the first housing which holds the optical connector, and wherein the optical connector held in the first housing is detachable from the second housing fixed to the attachment object, in the direction perpendicular to the direction directed to the mating optical connector device.

2. The optical connector device according to claim 1, wherein the to-be-locked portion comprises a projection receiving portion and a lock receiving portion, the locking portion comprises a projection and a projecting locking portion, the projection receiving portion engages with the projection, and the lock receiving portion engages with the projecting locking portion.

3. A mating optical connector device adapted to be connected to the optical connector device according to claim 1, the mating optical connector device comprising a mating second housing for receiving and holding a mating optical connector and a mating first housing for detachably holding the mating second housing, and the mating first housing is adapted to be attached to a mating attachment object.

4. The mating optical connector device according to claim 3, wherein the mating second housing is engaged with and held by the mating first housing in a floating manner such that the mating second housing is movable relative to the mating first housing.

* * * * *